United States Patent [19]

Cros

[11] 4,278,895
[45] Jul. 14, 1981

[54] HYDROELECTRIC POWER STATION

[75] Inventor: Pierre Cros, Paris, France

[73] Assignee: Spie-Batignolles, Puteaux, France

[21] Appl. No.: 98,550

[22] Filed: Nov. 29, 1979

[30] Foreign Application Priority Data

Dec. 14, 1978 [FR] France .............................. 78 35189

[51] Int. Cl.³ ............................................. F03B 13/08
[52] U.S. Cl. ...................................... 290/52; 415/157
[58] Field of Search .................. 290/52; 416/209, 219; 415/157, 2; 417/336

[56] References Cited

U.S. PATENT DOCUMENTS

| 1,673,605 | 6/1928 | Tappan et al. | 415/157 |
| 1,682,966 | 9/1928 | Hoppes | 415/157 |
| 3,184,218 | 5/1965 | Hochwalt et al. | 290/52 |
| 3,582,667 | 6/1971 | Mayo, Jr. | 290/52 |

FOREIGN PATENT DOCUMENTS

| 912320 | 5/1954 | Fed. Rep. of Germany | 290/52 |
| 1060860 | 4/1954 | France | 290/52 |
| 1546206 | 11/1968 | France | 290/52 |
| 329154 | 5/1958 | Switzerland | 290/52 |

OTHER PUBLICATIONS

Schwanda, J. & Osmer, H., Die Koustruktion direkt angetriebener Rohrturbinen-Genetatoren, Brown-Boveri Mitteilungen, vol. 61, No. 7, Jul. 1974 pp. 332-335.

Primary Examiner—J. V. Truhe
Assistant Examiner—D. L. Rebsch
Attorney, Agent, or Firm—Young & Thompson

[57] ABSTRACT

In a low-head hydroelectric power station, a turbine runner is mounted within the hub of a convergent-divergent draft tube at the base of a dam. At least one turbine is coupled to one or more electric generators housed within a casing which is totally submerged within the upstream pool. The distance from the generator casing to the draft tube intake is sufficient to prevent any interference with the water flow. The casing is provided with a vertical access and inspection shaft, the top opening of which is located above the normal water level and removably fixed on a flooring structure.

17 Claims, 11 Drawing Figures

HYDROELECTRIC POWER STATION

This invention relates to a low-head hydroelectric power station.

A power station of this type usually comprises a dam forming a separation between the upstream pool and the downstream pool of a watercourse. A turbine mounted within a conduit or draft tube located at the base of the dam is coupled mechanically to the shaft of an electric generator, usually through a speed increaser.

In a low-head power station, the generator location to be adopted proves to be a matter of some difficulty since the small height of the dam makes it impossible to provide masonry extensions of sufficiently large size to house the generator unit. It has been proposed to mount the unit downstream of the dam on a special structure but this expedient carries a heavy cost penalty from a civil engineering standpoint and also interferes with the water flow on the downstream side.

One known solution lies in the use of a bulb-turbine unit in which the generator is enclosed within a housing of special shape which is substantially of revolution about the common axis of the turbine and of the generator. The turbine is located at the tapered end of the housing, the hydrodynamic profile of the complete assembly being designed to prevent breakaway of the boundary layer and eddy currents.

A shaft which is open to free air continuously ensures ventilation of the generator and permits entry of maintenance personnel into the generator housing for maintenance purposes. The opening of said shaft is located above maximum flood-water levels.

In bulb units of fairly large size corresponding to high water flow rates, the transverse dimensions of the ventilating shaft are small compared with those of the bulb, with the result that the flow of water within the annular duct around the bulb is disturbed only to a slight extent. It is an entirely different matter in the case of small units which are designed to handle low water flow rates and in which the cross-sectional area of the ventilating shaft is of the same order of magnitude as the cross-sectional area of the bulb. It is necessary in such cases to have recourse to solutions other than that mentioned above, or to the arrangement which consists in housing the generator within a gallery formed within the mass of the dam structure but this arrangement, among other disadvantages, entails the need for a water passageway having curved portions which result in pressure drops.

The aim of this invention is to provide a hydroelectric power station involving simple and economical construction even in the case of low-head service and low flow rates without giving rise to any appreciable pressure drops either upstream or downstream of the turbine.

In accordance with the invention, the low-head hydroelectric power station comprises a dam which forms an upstream pool and a downstream pool in a watercourse, at least one turbine located within a passageway formed at the base of the dam, and at least one electric generator coupled to the turbines and housed within a totally submerged casing. The invention is characterized in that said generator casing is located within the upstream pool at a distance from the dam and the turbine and upstream of the high flow-velocity zone, said casing being provided with an inspection shaft having an opening located above the normal water level and fixed on a flooring structure in a demountable and removable manner.

By reason of the fact that the aforementioned distance is of sufficient value, the generator casing can have relatively large dimensions without interfering with the water flow while permitting ready access to the machines, and can also be provided with an access shaft of reasonable size.

Furthermore, the demountable and removable character of the generator casing and of its internal equipment permits complete assembly of the entire casing unit at works, thus reducing on-site erection operations. The complete unit can also be disassembled during use for carrying out repair work on the bank of a watercourse.

In many cases, flow conditions are such that the generator casing as a whole need only be located at a distance from the turbine which is at least equal to twice the diameter of the turbine wheel or runner. It is only under exceptional circumstances that it will be found necessary to increase this distance to a value exceeding ten times the diameter of the runner.

In a preferred embodiment of the invention, the generator is coupled mechanically to the turbines by means of respective 90° counter-motion drive units so as to ensure that the generator shaft is substantially horizontal and perpendicular to the direction of flow of water in the watercourse.

It is known that, in accordance with customary practice, the turbine shaft is downwardly inclined towards the downstream end, especially in order to ensure that the conical diffuser of the turbine is always under load. The arrangement indicated in the foregoing secures the double advantage of reduced overall length in the axial direction as well as a horizontal position of the generator shaft which is thus endowed with mechanically satisfactory equilibrium.

In the relatively frequent case in which a speed increaser is necessary, the invention advantageously proposes to combine said speed increaser with the counter-motion drive unit.

In one advantageous embodiment of the invention, the power station comprises a plurality of turbines, the shafts of which are each coupled to a counter-motion drive unit, the output shafts of these units being arranged in coaxial pairs and coupled mechanically to the generator shaft.

This arrangement is particularly advantageous in the case of low-head power stations in which the permissible diameter of the draft tube is limited and in which the power of each turbine is consequently also limited. The invention accordingly makes it possible to couple a number of turbines to a single generator which has a higher power rating and is equipped with a single control-panel unit.

In an improved embodiment of the invention, the coaxial shafts of the counter-motion drive units are coupled to the generator shaft by means of a speed-changing mechanism in order to maintain the generator at a constant running speed in spite of variable hydraulic conditions.

Again in the case of two turbines coupled to a single generator, each counter-motion drive unit is fitted with a clutch-coupling device on its output shaft.

One of the two turbines can then be readily put into service or withdrawn from service without entailing any need for shutdown of the power station.

In a preferred embodiment of the invention, the power station comprises a movable shut-off valve for the draft tube within the dam, said shut-off valve being slidably mounted on the turbine shaft and actuated by control means attached to the generator casing.

The shut-off device just mentioned is both lower in cost and more reliable than orientable vanes, remote control of which is also costly and complex.

According to the invention, the means for controlling the shut-off valve comprise hydraulic jacks attached to the generator casing, thus constituting a device of economical and rugged construction.

As a safety measure, the jacks are provided with springs so arranged as to apply the shut-off valve against the draft-tube intake in the event of lack of pressure of the hydraulic fluid.

In accordance with an advantageous improvement of the invention, provision is made for a tube fixed on the casing in coaxial relation to the turbine shaft in order to serve as a support for the shut-off valve in the open position of this latter.

In the open position, the shut-off valve is no longer supported on the valve-seat. The device just mentioned provides a support for said valve in order to prevent this latter from vibrating.

In a preferred embodiment of the invention, the inspection shaft is provided with a leak-tight lock-chamber.

It may happen that the inspection shaft is accidentally submerged, for example at the highest floodwater levels, but the machines contained within the casing are not liable to be damaged. It is therefore possible to construct inspection shafts of relatively low height, thus preserving the beauty of the surrounding landscape.

In accordance with an important improvement of the invention, the water-tight lock-chamber communicates with a submerged bell-housing, the bottom edge of the skirt of said housing being located approximately at the same level as the point of penetration of the turbine shaft into the generator casing.

By virtue of this arrangement, there is continuously maintained within the lock-chamber a pressure which increases with the depth of immersion and serves to prevent infiltrations of water into the casing in the event of accidental defects in leak-tightness.

In a preferred embodiment of the invention, the generator casing is constituted by a double shell and blowers are keyed on the shafts of the rotating machines in order to produce a circulation of air within the double shell.

There is thus obtained a sufficient convection on the outer shell of the casing to limit the temperature within the interior of this latter.

In an improved embodiment of the invention, provision is made for a water-cooling unit located within the generator casing on the path of the air flow. This cooling unit can advantageously be connected by means of piping to a heat-recovery installation.

A feature which can be provided either by way of alternative or in combination consists of beams for supporting the rotating machines within the generator casing, said beams being hollow and adapted to communicate with the watercourse.

Further distinctive features and advantages of the invention will become apparent from the following detailed description, reference being made to the accompanying drawings which are given by way of example without any limitation being implied, and in which.

Figure 1:
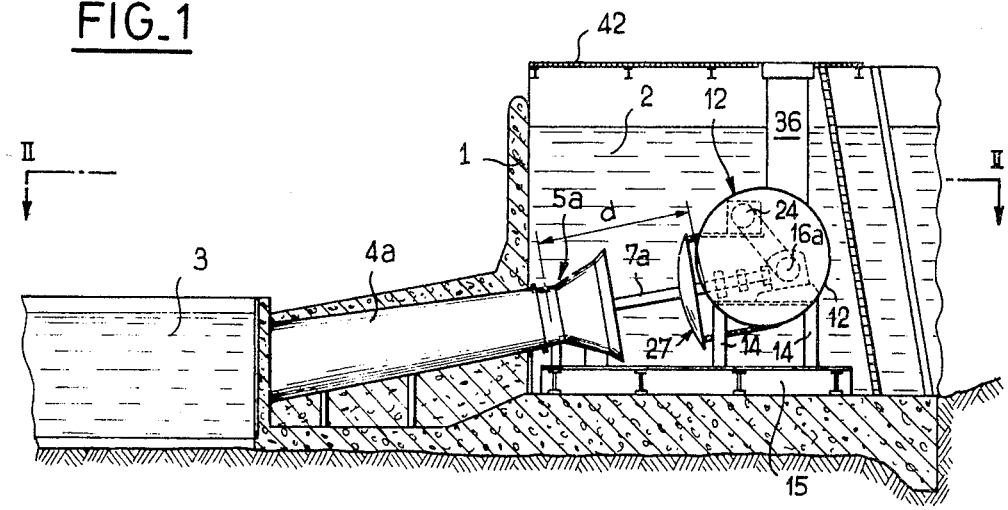
FIG. 1 is a general sectional view in elevation showing a power station according to the invention, this view being taken along line I—I of FIG. 2.

Referring to FIGS. 1 to 4, the hydroelectric power station according to the invention comprises a dam 1 which defines an upstream pool 2 and a downstream pool 3 in a watercourse.

Conduits 4a, 4b designated hereinafter as draft tubes are formed at the base of the dam. Turbines 5a, 5b are housed respectively within said draft tubes and the turbine runners 6a, 6b are keyed on the respective shafts 7a, 7b.

Each shaft 7a, 7b is carried on the one hand by a bearing 8 of the rubber bearing-bush type which is mounted at the center of a star-shaped intake guide-vane unit 9 and on the other hand by a bearing 11 located within a casing 12 into which the shaft penetrates through a packing-gland seal 13.

The sheet-metal casing 12 is supported by legs 14 on a flooring structure 15 and is totally submerged in the upstream pool 2. The flooring structure 15 is entirely independent of the structure of the dam 1 and the legs 14 can be detached from said flooring structure by means of a nut-and-bolt system, for example. The casing 12 is located at a sufficient distance from the turbine runners 6a, 6b to ensure that the presence of said casing causes negligible disturbance of the water flow at the level of the runners. In the example herein described, the casing is entirely located at a distance d from the runners which is slightly greater than twice the diameter of the largest runner in a region in which the water velocity corresponds to the flow velocity of the watercourse on the upstream side.

In the example herein described, the casing 12 is cylindrical, has a horizontal axis, is parallel to the dam, and has a diameter of approximately two meters in order to facilitate inspection of the machines by operating personnel.

Within the casing 12, each turbine shaft 7a, 7b is coupled to the input shaft of a speed increaser 16a, 16b which rests on a platform 17. The respective output shafts 18a, 18b of the speed increasers are located at an angle of 90° with respect to the input shafts so as to form counter-motion drive units.

Figure 4:
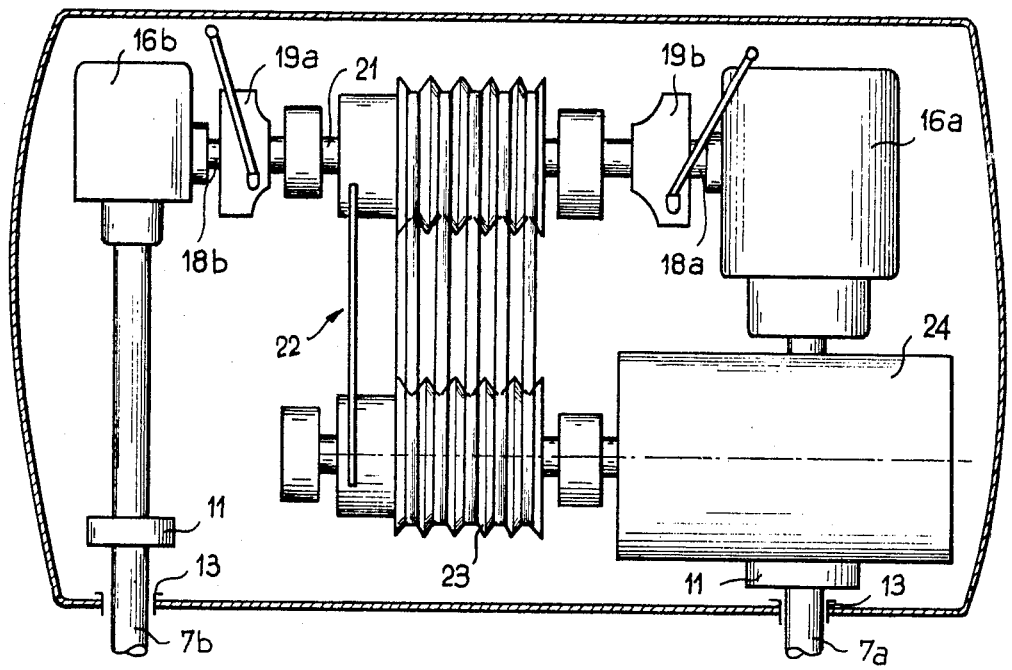
FIG. 4 is a sectional view taken along line IV—IV of FIG. 3.

Said output shafts are also coaxial (as shown in FIG. 4) and coupled through clutch-type devices 19a, 19b to a common intermediate shaft 21 constituting the input shaft of a V-belt speed-changing mechanism 22, the output pulley 23 of which is keyed on the shaft of an electric generator 24, said generator being placed on a platform 25.

Figure 5:
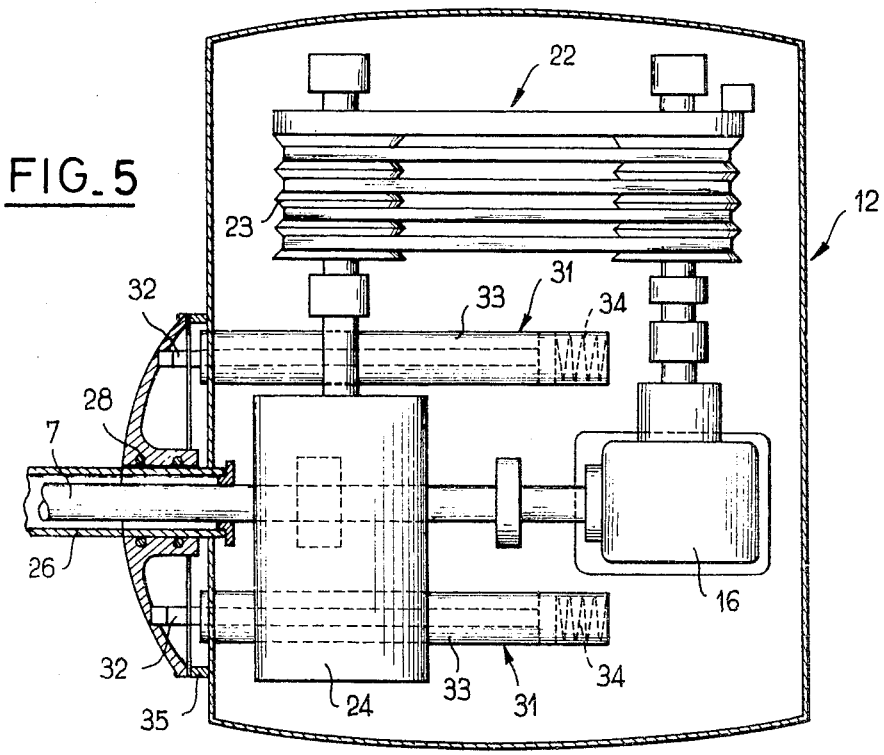
FIG. 5 is a view which is similar to FIG. 4 but in an embodiment consisting of a single turbine.
Figure 2:
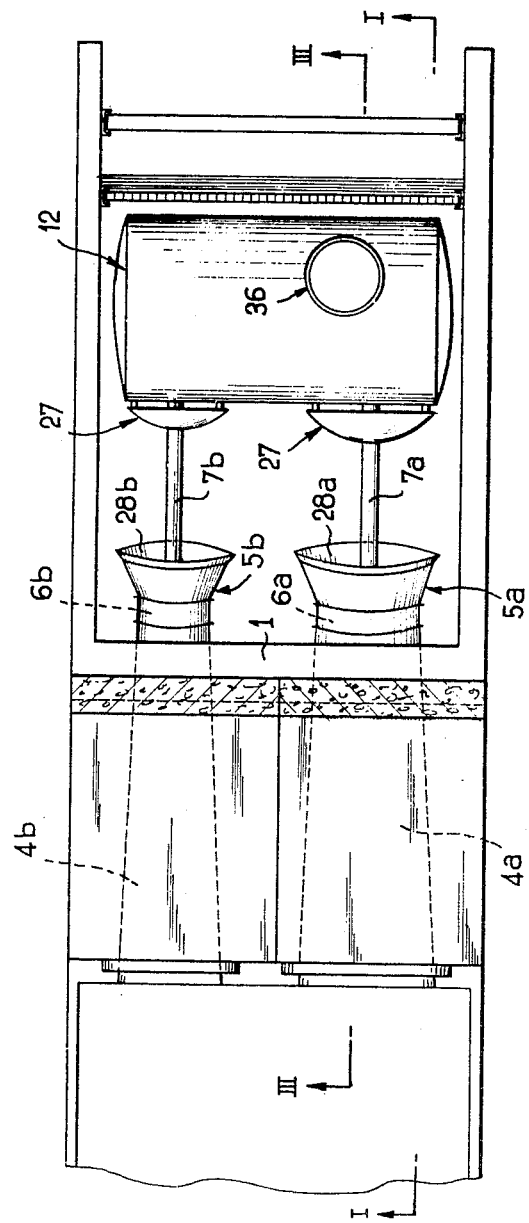
FIG. 2 is a sectional plan view taken along line II—II of FIG. 1.
Figure 3:
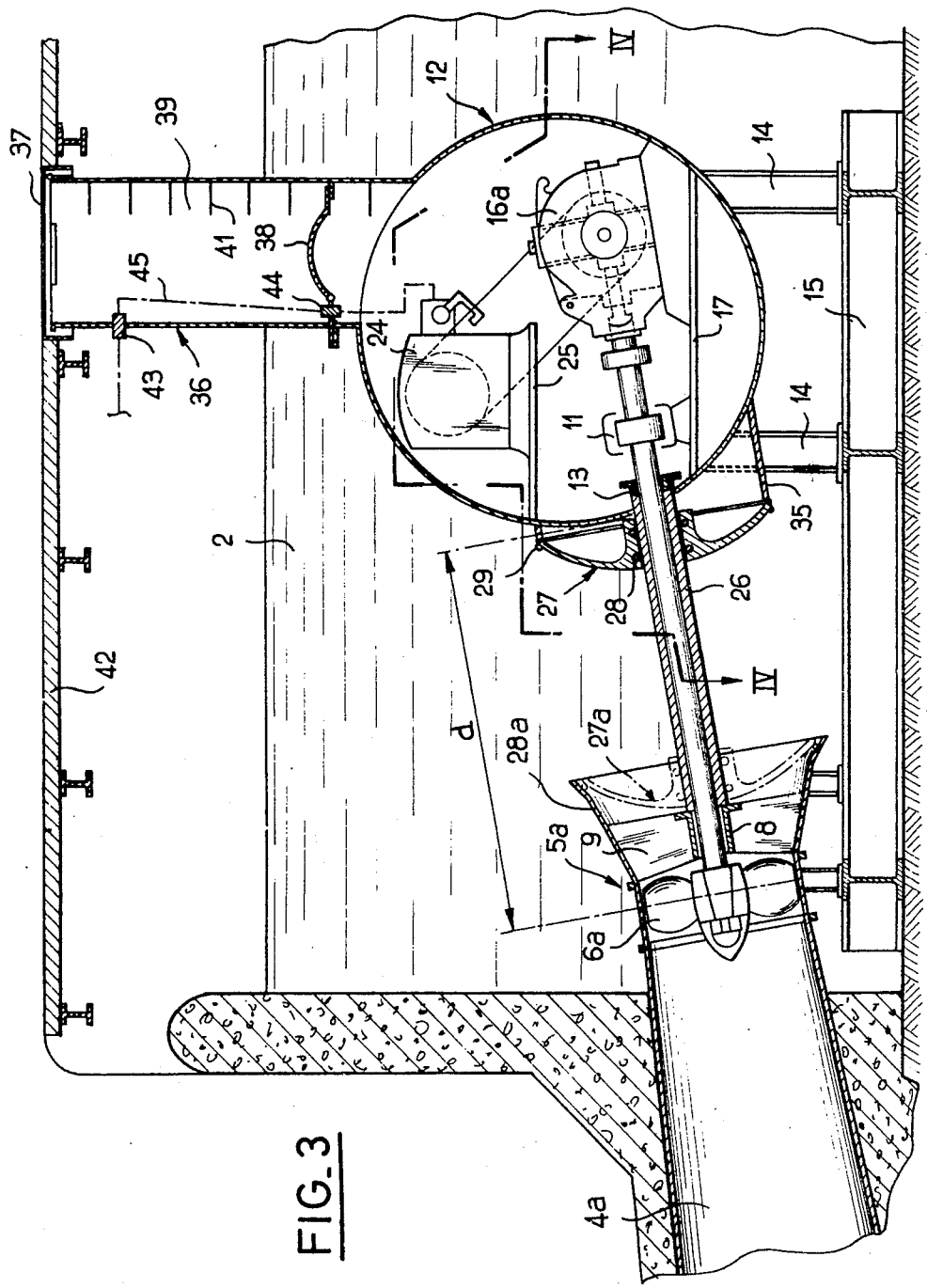
FIG. 3 is a view in elevation which is similar to FIG. 1 but to a larger scale and taken along line III—III of FIG. 2.

There is shown in FIG. 5 an alternative embodiment in which the power station comprises only one turbine.

The single shaft 7 is coupled to a speed increaser 16, the output shaft of which drives a speed-changing mechanism 22, the output pulley 23 of which is keyed on the shaft of an electric generator 24.

The result achieved in both cases by the structure described in the foregoing is that the generator shaft is substantially horizontal and perpendicular to the direction of flow of the water in the watercourse.

Each shaft 7a, 7b is contained within a coaxial tube 26 which is secured at each end respectively to the intake guide-vane unit 9 of the draft tube and to the generator casing 12. Said tube is pierced with holes along its bottom generating-line in order to permit free circulation of water. The packing-gland seal 13 mentioned earlier is in fact fixed on that end of the tube 26 which penetrates into the casing 12. A shut-off valve 27 which is coaxial with each tube 26 is slidably mounted on the tube by making use of suitable means such as ball-bearings 28. Said shut-off valve is designed in the shape of a spherical cap having a diameter such that this latter can be applied against the flared intake 28a, 28b of the turbine and thus seal-off said intake in position 27a. To this end, said valve is fitted with a peripheral rubber seal 29.

Two twin jacks 31 are located within the generator casing 12 and parallel to each turbine shaft 7a, 7b, the operating rods 32 of said jacks being attached to the shut-off valve 27 and the jack bodies 33 being attached to the casing 12. For the sake of enhanced clarity of the drawings, said jacks have been shown only in FIG. 5. Their range of travel is such that they are capable of producing a displacement of the shut-off valve 27 between its closed position 27a and its open position 27. Said jacks are connected by means of pipes (not shown) to a source of hydraulic fluid under pressure by means of control cocks. Moreover, each jack is fitted with a spring 34 which, in the event of lack of pressure of the hydraulic fluid, tends to return the shut-off valve 27 to the closed position 27a.

A tube 35 which is coaxial with each shaft 7a, 7b is fixed on the casing 12 and equal in diameter to the shut-off valve 27, said valve being thus received by the tube and applied against this latter in its open position.

An access shaft 36 is fixed on the casing 12 and extends vertically to a predetermined height above the normal level of the upstream pool 2. Said access shaft is fitted at its upper end with a water-tight cover 37 and with another water-tight cover 38 in the vicinity of the casing 12 so as to form a leak-tight lock-chamber 39 between these two covers. Ladder rungs 41 enable personnel to climb down from an access floor 42 into the interior of the casing 12.

Packing-gland seals 43 and 44 placed respectively in the access shaft wall and in a stationary portion of the cover 38 serve as lead-out passages for the electric connecting cables 45.

In an improved embodiment of the invention which is mentioned here by way of alternative (with reference to FIG. 6), a submerged bell-housing 46 having an open lower end is fixed against the dam 1 and communicates with the access shaft 36 through a duct 47. The bottom edge of the bell-housing 46 is located approximately at the same level as the point of penetration of the turbine shafts 7a, 7b into the generator casing 12.

The electric power lines 45 extend within the duct 47 and are passed out through a branch 48 of said duct.

A control valve 49 placed in the duct 47 serves to isolate the bell-housing from the lock-chamber when this latter is opened. Finally, the branch 48 is connected to a source of compressed air (not shown).

Figure 7:
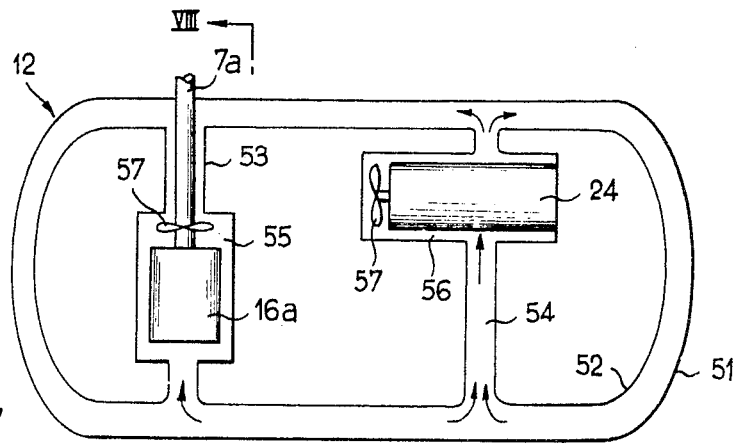
FIG. 7 is a semi-diagrammatic sectional plan view showing the double wall of the generator casing.
Figure 8:
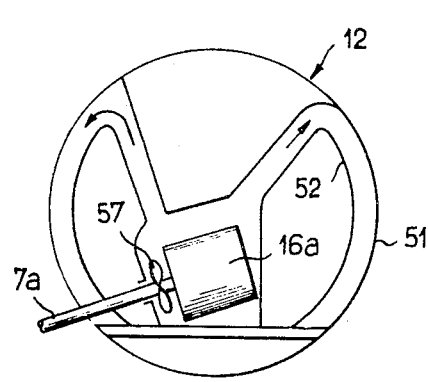
FIG. 8 is a sectional view taken along line VIII—VIII of FIG. 7.

As shown in FIGS. 7 and 8, the generator casing 12 is constituted by an outer shell 51 and an inner shell 52. Ducts 53, 54 are formed within the inner shell 52 and the rotating machines 16a, 24 are housed within cavities 55, 56 located on the path of said ducts. Each machine is provided with a blower for circulating air in a closed circuit within the space formed between the shells.

Figure 11:
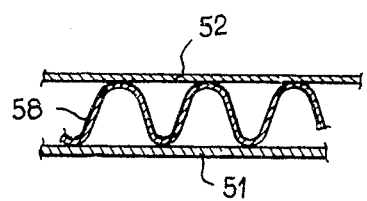
FIG. 11 is a detail view showing the construction of the double wall.

Attachment of the inner shell 52 to the outer shell 51 is carried out by means of corrugated sheet-metal elements 58 (as shown in FIG. 11) or by means of ribs.

Figure 9:
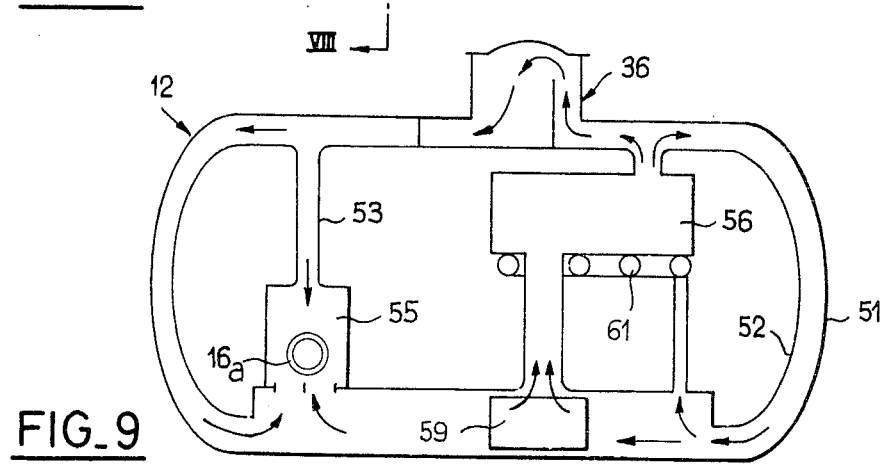
FIG. 9 is a semi-diagrammatic sectional view in elevation showing the installation of a cooling unit.

In an alternative embodiment of the invention shown in FIG. 9, a water-cooling unit 59 which is connected to the exterior by means of circulation pipes (not shown) serves to recover part of the heat generated by the machines.

In a further alternative embodiment of the invention, a certain number of the beams which serve to support the platforms 17 and 25 (which in turn support the rotating machines) are constituted by tubes 61 which communicate with the upstream pool and give rise to a circulation of water.

The operation of the installation hereinabove described will now be explained.

When the shut-off valve 27 is open to the two flared draft-tube intakes 28a, 28b, the water flows into the turbines and drives the shafts 7a, 7b in rotation so as to actuate the generator 24 by means of the speed increasers 16a, 16b of the common shaft 61 and of the speed-changing mechanism 22.

By reason of the relatively substantial distance between the generator casing 12 and the flared draft-tube intakes, the flow disturbance arising from the presence of the casing is completely damped at the level of the flared intakes. This disturbance is in any case very slight since the casing 12 is located in a region in which the water flows at low velocity.

The speed-changing mechanism 22 is regulated so as to obtain the desired rotational speed of the generator 24 according to the hydraulic conditions prevailing at any given moment.

Depending on the available hydraulic reserve or on the electric power requirement, either of the two turbines can be withdrawn from service or put into service by means of the clutch-coupling devices 19a, 19b.

Since the height of the access shaft 36 is limited to the floor 42 in order to avoid any detriment to the landscape, said floor may be submerged during flood flows at peak levels. By virtue of the two water-tight covers 37 and 38, the water does not penetrate into the generator casing and the only consequence of floods is to prevent the possibility of inspecting machines over a relatively short time interval.

During a period of normal water level, the machines are readily accessible by reason of the relatively large dimensions which can be given to the inspection shaft and to the generator casing without any attendant danger of disturbing the flow within the convergent-divergent draft tubes for the reasons explained earlier.

Figure 6:
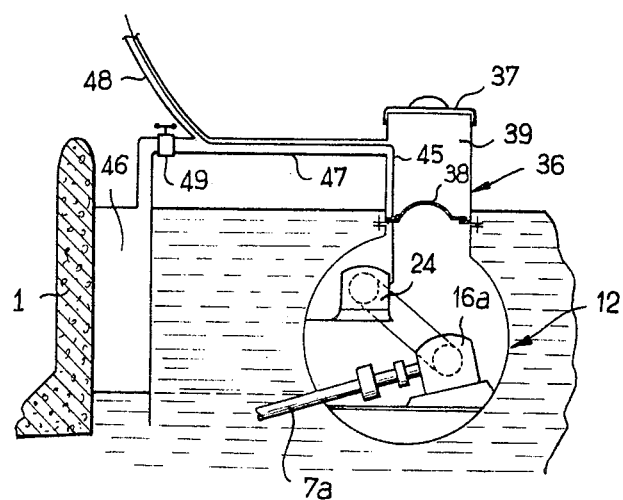
FIG. 6 is a semi-diagrammatic sectional view in elevation showing the bell-housing which is associated with the lock-chamber.

The embodiment of FIG. 6 corresponds to the case in which it is desired to guard against any infiltration of water arising, for example, from accidental leakage at the packing-gland seal 13. Back-pressure exerted by the bell-housing at the level of the packing-gland seal prevents admission of water.

A leakage flow through the covers 37 and 38 may give rise to a slight accumulation of water at the bottom of the generator casing but this is of no importance by reason of the large dimensions of this latter. If the water level within the casing exceeds the level of the packing-gland seal 13, the overpressure will have a tendency to drive said water through the seal.

Air leakages which could eventually take place within the bell-housing and lock-chamber assembly can be compensated by means of an injection of compressed air.

It will be readily understood that, when the lock-chamber is opened, the control valve 49 must be closed beforehand in order to prevent the water from rising within the bell-housing 46.

When the machines are rotating, the blowers 57 cause the air to circulate between the outer shell 51 and the inner shell 52, thus producing a sufficient heat exchange between the air and the outer wall 51 to maintain the interior of the generator casing at a sufficiently low temperature, the heat produced being finally discharged to the river.

In the embodiment of FIG. 9, the water-cooling unit makes it possible to recover the heat generated, for example for the purpose of heating staff premises.

Figure 10:
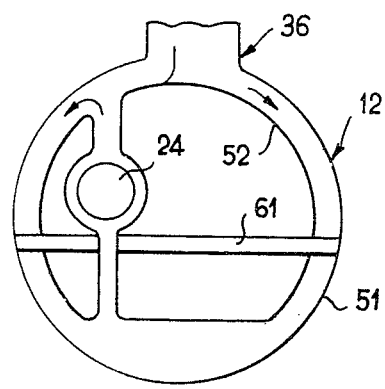
FIG. 10 is a semi-diagrammatic transverse sectional view showing the installation of a hollow beam.

The water tubes 61 (shown in FIG. 10) serve to achieve enhanced cooling by providing an additional cold surface.

Finally, the invention advantageously makes provision for a drainage pump (not shown) located within the generator casing 12 in order to discharge water which originates in particular from accidental seepage.

The invention solves the problem presented by the utilization of very low heads and makes it possible to overcome the difficulties arising from the small available space. Installation of machines and means of access can result in a relatively large bulk without thereby interfering with the water flow. Moreover, one advantage offered by the use of 90° counter-motion drive units is that two turbines can readily be coupled to a single generator. A further advantage is that the entire bulk of the power station equipment can be spread over the width of the watercourse, in other words without making it necessary to extend the installation over a considerable length of the watercourse and without increasing the overall height.

Civil engineering work is reduced to a minimum and erection is straightforward. By reason of the light weight of components, most of the equipment can be assembled and mounted at the works, delivered to site in the preassembled state, a positioning operation being all that is finally necessary.

Conversely, in the event of occurrence of a major fault condition, the above-mentioned possibility of disassembly of the legs 14 makes it possible to lift the complete assembly out of the water in order to carry out repair work on the bank of the watercourse without any inconvenience.

The intake guide-vane unit 9 is readily accessible during operation and can easily be freed from any foreign bodies which may obstruct this unit.

A further important advantage of the invention lies in the fact that a number of turbines of small diameter can be coupled to one and the same generator. Aside from the fact that this reduction in diameter permits utilization of very low headwater levels, it offers the further possibility of increasing the running speed of turbines, therefore of reducing the torque and also of reducing the ratio of the speed increaser.

It will be readily apparent that the invention is not limited to the examples hereinabove described but extends to any alternative form of construction within the capacity of anyone versed in the art, especially those forms which have been indicated in the foregoing description.

It is possible, for example, to couple more than two turbines to a single generator. In the case of four turbines, the four speed increasers are grouped together in pairs, the output shafts of each pair being coaxial. There are employed in this case two speed-changing units which are in turn coupled to the turbine shaft.

What is claimed is:

1. A low-head hydroelectric power station comprising a dam forming an upstream pool and a downstream pool in a watercourse, at least one turbine having a turbine runner located within a high flow-velocity passageway formed at the base of the dam, and at least one electric generator coupled to the turbines and housed within a totally submerged casing, wherein said generator casing is located within the upstream pool at a distance from the dam and the turbine and upstream of the high flow-velocity zone, said casing being provided with an inspection shaft having an opening located above the normal water level and fixed on a flooring structure in a demountable and removable manner.

2. A hydroelectric power station according to claim 1, wherein the generator casing is entirely located at a distance from the turbine which is at least equal to twice the diameter of the turbine runner.

3. A hydroelectric power station according to claim 1 or claim 2, wherein the generator is coupled mechanically to the turbines by means of respective 90° counter-motion drive units so as to ensure that the generator shaft is substantially horizontal and perpendicular to the direction of flow of water in the watercourse.

4. A hydroelectric power station according to claim 3, wherein the counter-motion driven unit comprises a speed increaser.

5. A hydroelectric power station according to claim 3 or claim 4, wherein said power station comprises a plurality of turbines in which the turbine shafts are each coupled to a counter-motion drive unit, the output shafts of said drive units being arranged in coaxial pairs and coupled mechanically to the generator shaft.

6. A hydroelectric power station according to claim 5, wherein the coaxial shafts of the counter-motion drive units are coupled to the generator shaft by means of a speed-changing mechanism.

7. A hydroelectric power station according to claim 5 or claim 6, wherein each counter-motion drive unit is fitted with a clutch-coupling device on its output shaft.

8. A hydroelectric power station according to claim 1, wherein a movable shut-off valve is provided for said high flow-velocity passageway within the dam, said shut-off valve being slidably mounted on the turbine shaft and actuated by control means attached to the generator casing.

9. A hydroelectric power station according to claim 8, wherein the means for controlling the shut-off valve comprise hydraulic jacks attached to the generator casing.

10. A hydroelectric power station according to claim 9, wherein the jacks are provided with springs so arranged as to apply the shut-off valve against the draft tube.

11. A hydroelectric power station according to claim 8, wherein provision is made for a tube fixed on the generator casing in coaxial relation to the turbine shaft in order to serve as a support for the shut-off valve in the open position of said valve.

12. A hydroelectric power station according to claim 1, wherein the inspection shaft comprises a water-tight lock-chamber.

13. A hydroelectric power station according to claim 12, wherein the water-tight lock-chamber communicates with a submerged bell-housing, the bottom edge of the skirt of said housing being located approximately at the same level as the point of penetration of the turbine shaft into the generator casing.

14. A hydroelectric power station according to claim 1, wherein the generator casing is constituted by a double shell and wherein blowers are keyed on the shafts of the rotating machines in order to produce a circulation of air within the double shell.

15. A hydroelectric power station according to claim 14, wherein said power station comprises a watercooling unit located within the generator casing on the path of the air flow.

16. A hydroelectric power station according to claim 15, wherein the cooling unit is connected by means of piping to a heat-recovery installation.

17. A hydroelectric power station according to claim 1, wherein the generator casing comprises beams for supporting the rotating machines, said beams being of hollow construction and adapted to communicate with the watercourse.

* * * * *